(12) United States Patent
Sung et al.

(10) Patent No.: US 11,245,158 B2
(45) Date of Patent: Feb. 8, 2022

(54) SEPARATOR AND ELECTROCHEMICAL DEVICE INCLUDING THE SAME

(71) Applicant: LG ENERGY SOLUTION, LTD., Seoul (KR)

(72) Inventors: Dong-Wook Sung, Daejeon (KR); Min-Ji Gu, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 15/774,049

(22) PCT Filed: Jun. 8, 2017

(86) PCT No.: PCT/KR2017/005977
§ 371 (c)(1),
(2) Date: May 7, 2018

(87) PCT Pub. No.: WO2017/213444
PCT Pub. Date: Dec. 14, 2017

(65) Prior Publication Data
US 2018/0315969 A1 Nov. 1, 2018

(30) Foreign Application Priority Data
Jun. 8, 2016 (KR) .......................... 10-2016-0071214

(51) Int. Cl.
| | | |
|---|---|---|
| *H01M 50/446* | (2021.01) | |
| *H01M 50/449* | (2021.01) | |
| *H01M 50/426* | (2021.01) | |
| *H01M 50/417* | (2021.01) | |
| *H01M 50/491* | (2021.01) | |
| *H01M 50/411* | (2021.01) | |
| *H01M 10/052* | (2010.01) | |
| *H01M 10/0525* | (2010.01) | |

(52) U.S. Cl.
CPC ....... *H01M 50/446* (2021.01); *H01M 10/052* (2013.01); *H01M 10/0525* (2013.01); *H01M 50/426* (2021.01); *H01M 50/449* (2021.01); *H01M 50/411* (2021.01); *H01M 50/417* (2021.01); *H01M 50/491* (2021.01)

(58) Field of Classification Search
CPC .. H01M 2/166; H01M 2/1686; H01M 10/052; H01M 10/0525; H01M 50/466; H01M 50/426; H01M 50/499; H01M 50/417; H01M 50/491; H01M 50/411
See application file for complete search history.

(56) References Cited

U.S. PATENT DOCUMENTS

| | | | | |
|---|---|---|---|---|
| 2008/0292968 A1* | 11/2008 | Lee | ......................... | H01M 2/14 429/247 |
| 2009/0061313 A1* | 3/2009 | Tadano | ................. | H01M 4/139 429/217 |
| 2012/0115036 A1 | 5/2012 | Lee et al. | | |
| 2013/0224555 A1 | 8/2013 | Hong et al. | | |
| 2013/0302661 A1* | 11/2013 | Kim | ....................... | H01M 2/145 429/144 |
| 2014/0272532 A1* | 9/2014 | Park | ....................... | H01M 2/166 429/144 |
| 2014/0272534 A1* | 9/2014 | Ueki | ................... | H01M 2/1646 429/144 |
| 2016/0049628 A1 | 2/2016 | Kim et al. | | |
| 2016/0056435 A1 | 2/2016 | Takeda | | |
| 2016/0104876 A1 | 4/2016 | Avison et al. | | |

FOREIGN PATENT DOCUMENTS

| | | |
|---|---|---|
| CN | 100593872 C | 3/2010 |
| CN | 105247703 A | 1/2016 |
| JP | 2007277406 A * | 10/2007 |
| JP | 2008-210541 A | 9/2008 |
| JP | 2008210541 A * | 9/2008 |
| JP | 2015-046230 A | 3/2015 |
| JP | 2016-46058 | 4/2016 |
| JP | 2016-072162 A | 5/2016 |
| JP | 2016-072197 A | 5/2016 |
| KR | 10-0758482 B1 | 9/2007 |
| KR | 10-2011-0097715 A | 8/2011 |
| KR | 10-2013-0126445 A | 11/2013 |

(Continued)

OTHER PUBLICATIONS

English translation of JP-2007277406-A (Year: 2007).*
EPO machine generated English translation of KR-2014-0096522-A (Year: 2014).*
EPO machine generated English translation of JP-2008210541-A (Year: 2008).*
English translation of the Written Opinion of the International Searching Authority (form PCT/ISA/237), dated Sep. 20, 2017, for International Application No. PCT/KR2017/005977.
International Search Report for PCT/KR2017/005977 dated Sep. 20, 2017.

*Primary Examiner* — Christopher P Domone
*Assistant Examiner* — Kimberly Wyluda
(74) *Attorney, Agent, or Firm* — Birch, Stewart, Kolasch & Birch, LLP

(57) ABSTRACT

Disclosed are a separator and an electrochemical device including the same. The separator includes: a porous substrate having a plurality of pores; and a pair of porous coating layers formed on at least one surface of the porous substrate, and including a plurality of inorganic particles and a binder disposed partially or totally on the surface of the inorganic particles to connect and fix the inorganic particles with each other, wherein the binder is used in an amount of 5-40 wt % based on the total weight of the porous coating layer, the inorganic particles include boehmite particles, the binder includes a fluorine-based binder and a rubber-based binder, and the fluorine-based binder and the rubber-based binder are used at a weight ratio of 80:20-99.9:0.1.

13 Claims, No Drawings

(56) References Cited

FOREIGN PATENT DOCUMENTS

| | | | |
|---|---|---|---|
| KR | 20140096522 A | * | 8/2014 |
| KR | 10-1515357 B1 | | 4/2015 |
| KR | 10-2015-0114275 A | | 10/2015 |
| KR | 10-2016-0020283 A | | 2/2016 |
| WO | WO 2006/062349 A1 | | 6/2006 |
| WO | WO 2014/179355 A1 | | 11/2014 |

* cited by examiner

SEPARATOR AND ELECTROCHEMICAL DEVICE INCLUDING THE SAME

TECHNICAL FIELD

The present disclosure relates to a separator and an electrochemical device including the same. Particularly, the present disclosure relates to a separator having improved adhesion with an electrode and an electrochemical device including the same.

The present application claims priority to Korean Patent Application No. 10-2016-0071214 filed on Jun. 8, 2016 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher driving voltage and significantly higher energy density as compared to conventional batteries, such as Ni-MH, Ni—Cd and sulfuric acid-lead batteries using an aqueous electrolyte. However, such lithium ion batteries have a problem of ignition and explosion caused by the use of an organic electrolyte and a disadvantage of a difficulty in manufacture.

Recent lithium ion polymer batteries improve such a problem and disadvantage of lithium ion batteries and are expected as one of the next-generation batteries. However, such lithium ion polymer batteries still have a relatively low capacity as compared to lithium ion batteries and particularly show an insufficient discharge capacity at low temperature. Thus, there is an imminent need for improving this.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, there has been suggested a separator having a porous organic-inorganic coating layer formed by applying a mixture of an excessive amount of inorganic particles and a binder onto at least one surface of a porous substrate having a plurality of pores.

DISCLOSURE

Technical Problem

The present disclosure is designed to solve the problems of the related art, and therefore the present disclosure is directed to providing a separator which has excellent dispersibility of inorganic particles and a binder, and thus shows improved adhesive property with an electrode.

The present disclosure is also directed to providing an electrochemical device including the separator.

Technical Solution

In one aspect of the present disclosure, there is provided the separators according to the following embodiments.

According to a first embodiment, there is provided a separator including:

a porous substrate having a plurality of pores; and a pair of porous coating layers formed on at least one surface of the porous substrate, and including a plurality of inorganic particles and a binder disposed partially or totally on the surface of the inorganic particles to connect and fix the inorganic particles with each other, wherein the binder is used in an amount of 5-40 wt % based on the total weight of the porous coating layer, the inorganic particles include boehmite particles, the binder includes a fluorine-based binder and a rubber-based binder, and the fluorine-based binder and the rubber-based binder are used at a weight ratio of 80:20-99.9:0.1.

According to a second embodiment, there is provided the separator of the first embodiment, wherein the fluorine-based binder is any one selected from the group consisting of polyvinylidene fluoride, polyvinylidene fluoride-co-hexafluoropropylene, polyvinylidene fluoride-co-trichloroethylene, polytetrafluoroethylene and polychlorotrifluoroethylene, or a mixture of at least two of them.

According to a third embodiment, there is provided the separator of the first embodiment or the second embodiment, wherein the rubber-based binder is any one selected from the group consisting of nitrile-butadiene rubber, hydrated nitrile-butadiene rubber, styrene-butadiene rubber, hydrated styrene-butadiene rubber and silicone rubber, or a mixture of at least two of them.

According to a fourth embodiment, there is provided the separator of any one of the first embodiment to the third embodiment, wherein the inorganic particles further include non-boehmite particles other than boehmite particles.

According to a fifth embodiment, there is provided the separator of the fourth embodiment, wherein the non-boehmite particles and boehmite particles are used at a weight ratio of 1:99-99:1.

According to a sixth embodiment, there is provided the separator of the fourth embodiment or the fifth embodiment, wherein the non-boehmite particles include inorganic particles having a dielectric constant of 5 or more, inorganic particles capable of transporting lithium ions or a mixture thereof.

According to a seventh embodiment, there is provided the separator of the sixth embodiment, wherein the inorganic particles having a dielectric constant of 5 or more include $BaTiO_3$, $Pb(Zr,Ti)O_3$ (PZT), $Pb_{1-x}La_xZr_{1-y}TiO_3$ (PLZT), $PB(Mg_3Nb_{2/3})O_3$—$PbTiO_3$ (PMN-PT), hafnia ($HfO_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC or a mixture thereof.

According to an eighth embodiment, there is provided the separator of the sixth embodiment, wherein the inorganic particles capable of transporting lithium ions include lithium phosphate (Li$_3$PO$_4$), lithium titanium phosphate (Li$_x$Ti$_y$(PO$_4$)$_3$, 0<x<2, 0<y<3), lithium aluminum titanium phosphate (Li$_x$Al$_y$Ti$_z$(PO$_4$)$_3$, 0<x<2, 0<y<1, 0<z<3), (LiAlTiP)$_x$O$_y$-based glass (0<x<4, 0<y<13), lithium lanthanum titanate (Li$_x$La$_y$TiO$_3$, 0<x<2, 0<y<3), lithium germanium thiophosphate (Li$_x$Ge$_y$P$_z$S$_w$, 0<x<4, 0<y<1, 0<z<1, 0<w<5), lithium nitride (Li$_x$N$_y$, 0<x<4, 0<y<2), SiS$_2$-based glass (Li$_x$Si$_y$S$_z$, 0<x<3, 0<y<2, 0<z<4), P$_2$S$_5$-based glass (Li$_x$P$_y$S$_z$, 0<x<3, 0<y<3, 0<z<7) or a mixture thereof.

According to a ninth embodiment, there is provided the separator of any one of the first embodiment to the eighth embodiment, wherein the porous substrate is a polyolefin-based porous substrate.

According to a tenth embodiment, there is provided the separator of the ninth embodiment, wherein the polyolefin-based porous substrate includes any one polymer selected from the group consisting of polyethylene, polypropylene, polybutylene and polypentene, or a combination thereof.

According to an eleventh embodiment, there is provided the separator of any one of the first embodiment to the tenth embodiment, wherein the porous substrate has a thickness of 5-50 μm, a pore size of 0.01-50 μm and a porosity of 10-95%.

In another aspect of the present disclosure, there is also provided the electrochemical devices according to the following embodiments.

According to a twelfth embodiment, there is provided an electrochemical device including a cathode, an anode and a separator interposed between the cathode and the anode, wherein the separator is the separator as defined in any one of the first embodiment to the eleventh embodiment.

According to a thirteenth embodiment, there is provided an electrochemical device of the twelfth embodiment, which is a lithium secondary battery.

Advantageous Effects

According to an embodiment of the present disclosure, a fluorine-based binder is used in combination with a rubber-based binder so that the dispersion stability of a slurry for forming a porous coating layer may be improved significantly. Thus, the dispersion and arrangement of the inorganic particles and binder in the porous coating layer become homogeneous, resulting in a significant increase in binding force between the inorganic particles and the binder and adhesion between an electrode and a separator. As a result, it is possible to improve the life characteristics of a battery.

Further, since boehmite particles having relatively low density are used, it is possible to assist weight lightening of a separator and electrochemical device. It is also possible to control a rapid increase in internal temperature of an electrochemical device caused by abnormal operation by virtue of excellent heat-absorbing property of boehmite particles.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The separator according to an embodiment of the present disclosure includes: a porous substrate having a plurality of pores; and a pair of porous coating layers formed on at least one surface of the porous substrate, and including a plurality of inorganic particles and a binder disposed partially or totally on the surface of the inorganic particles to connect and fix the inorganic particles with each other, wherein the binder is used in an amount of 5-40 wt % based on the total weight of the porous coating layer, the inorganic particles include boehmite particles, the binder includes a fluorine-based binder and a rubber-based binder, and the fluorine-based binder and the rubber-based binder are used at a weight ratio of 80:20-99.9:0.1.

The binder may be used in an amount of 5-40 wt %, particularly 5-30 wt %, and more particularly 10-30 wt %, based on the total weight of the porous coating layer.

When the binder is used in an amount larger than 40 wt %, an excessive amount of binder is present in the pores of the resultant porous coating layer, thereby reducing the pore size and porosity. When the binder is used in an amount less than 5 wt %, peeling resistance of the porous coating layer is decreased, resulting in degradation of adhesion force.

The separator according to the present disclosure is characterized by using, as binders, a fluorine-based binder and a rubber-based binder at the same time.

The weight ratio between the fluorine-based binder and the rubber-based binder is 80:20-99.9:0.1, particularly 80:20-99:1, and more particularly 80:20-97.5:2.5 or 80:20-95:5, 80:20-90:10 or 85:15-90:10. When the weight ratio between the fluorine-based binder and the rubber-based binder satisfy the above-defined range, it is possible to improve the dispersibility of a slurry for forming a porous coating layer significantly and to increase the adhesion between a separator and an electrode.

More particularly, when a fluorine-based binder is used alone as a binder for a slurry for forming a porous coating layer, the fluorine-based binder is advantageous in that it provides high adhesion strength with the inorganic particles and electrode layers. However, dispersibility of the inorganic particles and binder in the slurry for forming a porous coating layer is degraded so that precipitation of the inorganic particles may occur with ease. However, when a rubber-based binder is further incorporated, it connects and stably fixes the inorganic particles together with the fluorine-based binder, thereby improving the phase stability of the slurry significantly.

As a result, the fluorine-based binder having high adhesion strength with the inorganic particles and electrode layers and the inorganic particles are dispersed and arranged uniformly. Thus, the binder can contribute uniformly to the adhesion with an electrode layer, while performing binding among the inorganic particles.

In addition, the rubber-based binder increases the flexibility and rolling property in the porous coating layer, and thus also functions to make binding between the separator provided with a porous coating layer and an electrode firmer.

Further, the rubber-based binder improves mechanical properties, such as flexibility and elasticity, of the porous coating layer and functions as a binder which connects and stably fixes the inorganic particles with each other, and thus contributes to prevention of degradation of mechanical properties of a separator having a porous coating layer.

The fluorine-based binder may be any one selected from the group consisting of polyvinylidene fluoride, polyvinylidene fluoride-co-hexafluoropropylene, polyvinylidene fluoride-co-trichloroethylene, polytetrafluoroethylene and polychlorotrifluoroethylene, or a mixture of at least two of them, but is not limited thereto.

The rubber-based binder may be any one selected from the group consisting of nitrile-butadiene rubber, hydrated nitrile-butadiene rubber (HNBR), styrene-butadiene rubber, hydrated styrene-butadiene rubber and silicone rubber, or a mixture of at least two of them.

According to an embodiment of the present disclosure, a binder used for a porous coating layer of a separator other than the above-mentioned fluorine-based binder and rubber-based binder may be further incorporated, and particular examples thereof include but are not limited to polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan and carboxymethyl cellulose.

According to the present disclosure, boehmite particles are used as inorganic particles.

Boehmite is represented by the chemical formula of AlO(OH) or $Al_2O_3H_2O$ and is a chemically stable alumina monohydrate obtained generally by heat treatment or hydrothermal treatment of alumina trihydrate in the air. Boehmite has a high dehydration temperature of 450-530° C. and may be controlled to have various shapes, including plate-like boehmite, needle-like boehmite and hexagonal plate-like boehmite, by adjusting the preparing condition. In addition, it is possible to control the aspect ratio or particle diameter by controlling the preparing condition. Therefore, it is possible to provide various applications with boehmite by using the properties thereof.

According to another embodiment of the present disclosure, the inorganic particles may further include non-boehmite particles. As used herein, the term 'non-boehmite particles' refers to inorganic particles other than boehmite particles.

Non-limiting examples of non-boehmite particles may include high-dielectric constant inorganic particles having a dielectric constant of 5 or more, particularly 10 or more, inorganic particles capable of transporting lithium ions or a mixture thereof.

Non-limiting examples of the inorganic particles having a dielectric constant of 5 or more include $BaTiO_3$, $Pb(Zr,Ti)O_3$(PZT), $Pb_{1-x}La_xZr_{1-y}Ti_yO_3$(PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or a mixture thereof.

As used herein, the term 'inorganic particles capable of transporting lithium ions' refers to inorganic particles which contains a lithium element and functions to transport lithium ions not to store lithium. Non-limiting examples of the inorganic particles capable of transporting lithium ions include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as $LiI$—$Li_2S$—$P_2S_5$, or a mixture thereof.

According to an embodiment of the present disclosure, the weight ratio of the non-boehmite particles to the boehmite particles may be 1:99-99:1, particularly 40:60-99:1, more particularly 50:50-95:5, even more particularly 60:40-95:5, or 70:30-95:5, or 85:15-95:5.

When the weight ratio of the non-boehmite particles and the boehmite particles satisfies the above-defined range, it is not required to increase the amount of binder significantly in order to prevent separation of boehmite caused by an increased amount of boehmite. In addition, the dispersion stability or processability of a coating composition for forming a porous coating layer is improved significantly, a porous coating layer having a uniform thickness can be formed, and the porosity of a porous coating layer can be controlled with ease.

The boehmite particles may have an average particle diameter 0.01-0.9 times, particularly 0.015-0.85 times, and more particularly 0.02-0.08 times higher than the average particle diameter of the non-boehmite particles.

According to another embodiment of the present disclosure, the non-boehmite particles may have an average particle diameter of 0.5-3 μm, particularly 0.5-2.7 μm, and more particularly 0.5-2.5 μm, while the boehmite particles may have an average particle diameter of 0.05-0.4 μm, particularly 0.07-0.37 μm, and more particularly 0.09-0.35 μm.

According to still another embodiment, the inorganic particles may include non-boehmite particles having an average particle diameter different from the average particle diameter of boehmite particles. Therefore, the dispersibility and coating processability of the inorganic particles in a composition for forming a porous coating layer are improved, controlling of the thickness of a coating layer is facilitated, and degradation of mechanical properties and electrical properties can be improved. In addition, since particles with a smaller particle diameter may be positioned in large pores formed between particles with a larger particle diameter, it is possible to control the size of pores of the resultant porous coating layer. It is also possible to prevent an internal short-circuit during charging and discharging of a battery by improving the density of the porous coating layer and inhibiting a heat shrinking phenomenon of the porous substrate.

Particularly, according to still another embodiment, non-boehmite particles are used in combination with boehmite particles having a smaller particle diameter as compared to the non-boehmite particles. Thus, it is possible to obtain more advantageous effects as described hereinafter, when compared to the use of the same type of inorganic particles merely different in terms of particle size.

For example, when the non-boehmite particles are alumina particles, alumina particles are compounds of aluminum and oxygen which have a chemical formula of $Al_2O_3$ and are known as electric insulators having relatively high heat conductivity and a density of 3.95-4.1 $g/cm^3$.

Meanwhile, the boehmite particles generally have a density of about 2.4-3.1 $g/cm^3$.

In addition, boehmite particles have excellent heat-absorbing property and contain hydroxyl groups to provide high hydrophilicity and to be controlled to have a high specific surface area. Thus, boehmite particles can function as carriers provided with additives useful for electrochemical devices. Further, boehmite has a heat conductivity similar to the heat conductivity of alumina and thus is useful as a heat conductive filler. Particularly, boehmite having a high aspect ratio shows anisotropy, and thus can provide increased heat conductivity in a predetermined direction even when it is added in a small amount. Thus, when an abnormal temperature increase occurs in an electrochemical device, boehmite can transfer heat to the outside by virtue of its high heat conductivity.

Therefore, when the porous coating layer according to the present disclosure uses alumina particles, which are non-boehmite particles, as larger-particle diameter inorganic particles, in combination with boehmite particles having a smaller average particle diameter and a relatively smaller density as compared to the alumina particles, it is possible to reduce the total weight of a separator and to assist weight lightening of an electrochemical device. In addition, as described above, boehmite particles can be realized as various shapes, such as a plate-like shape, other than a spherical shape. Thus, even when spherical alumina particles are arranged while being adjacent to each other or being spaced apart significantly from each other, boehmite particles can be disposed easily in various shapes of pores among the alumina particles. As a result, it is possible to improve the density and mechanical properties of a porous coating layer significantly and to inhibit heat shrinking of a porous substrate, and thus to prevent an internal short-circuit of an electrochemical device.

For example, when using alumina particles having different average particle diameters, or larger-particle diameter alumina particles and smaller-particle diameter alumina particles, smaller-particle diameter alumina particles are problematic in that they are significantly expensive and are difficult to handle as compared to larger-particle alumina particles. However, according to an embodiment of the present disclosure, alumina particles are used in combination with boehmite particles having a smaller average particle diameter than that of alumina particles. Therefore, it is possible to overcome the above-mentioned problem.

The porous substrate may be a porous polymer substrate, particularly a porous polymer film substrate or porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the abovementioned polymers, such as polyolefins and polyesters, alone or in combination.

In addition to the above-mentioned polyolefins, the porous polymer film substrate and the porous non-woven web substrate may include polyethylene terephthalate, polybutylene terephthalate, polyester, polyacetal, polyamide, polycarbonate, polyimide, polyether ether ketone, polyether sulfone, polyphenylene oxide, polyether sulfone, polyphenylene oxide, polyphenylene sulfide, polyethylene naphthalene, or the like, alone or in combination.

Although there is no particular limitation in the thickness of the porous substrate, the porous substrate may have a thickness of 1-100 particularly 5-50 μm. Although the pore size and porosity of the pores present in the porous substrate are not also limited particularly, it is preferred that the pore size and porosity are 0.01-50 μm and 10-95%, respectively.

Besides the above-mentioned inorganic particles and polymer, the separator according to an embodiment of the present disclosure may further include other additives as ingredients for the porous coating layer.

The separator according to an embodiment of the present disclosure may be obtained by preparing a composition for forming a porous coating layer which includes inorganic particles including boehmite particles, and a binder including a fluorine-based binder and a rubber-based binder, and then applying the composition onto at least one surface of a porous substrate, followed by drying.

First, the composition for forming a porous coating layer may be obtained by dissolving a binder into a solvent, adding inorganic particles thereto and dispersing them. The inorganic particles may be added after they are pulverized in advance to a predetermined average particle diameter. Otherwise, the inorganic particles may be added to a binder solution, and then pulverized and dispersed while controlling them to have a predetermined average particle diameter by using a ball milling process, or the like.

Although there is no particular limitation in the process for coating the composition for forming a porous coating layer onto the porous substrate, it is preferred to use a slot coating or dip coating process. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the porous substrate coated with the composition for forming a porous coating layer is dried by using a dryer, such as an oven, thereby forming porous coating layers having a symmetric structure on both surfaces of the porous substrate.

In the porous coating layers, the inorganic particles are bound among themselves by the binder while they are packed and are in contact with each other. Thus, interstitial volumes are formed among the inorganic particles and the interstitial volumes become vacant spaces to form pores.

In other words, the binder attaches the inorganic particles to each other so that they may retain their binding states. For example, the binder connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles.

The electrochemical device according to another aspect of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Polyvinylidene fluoride-co-hexafluoroproyplene (PVdF)—HFP and nitrile-butadiene rubber as binders were added to acetone and dissolved therein at 50° C. for about 12 hours or more to prepare a binder polymer solution. To the resultant binder polymer solution, boehmite (γ-ALO(OH)) particles having an average particle diameter of 200 nm and alumina ($Al_2O_3$) particles having an average particle diameter of 500 nm were added, and then dispersed therein to obtain a slurry for a porous coating layer. Herein, the weight ratio between the alumina particles and boehmite particles was 85:15.

The obtained slurry was coated onto both surfaces of a polyethylene porous membrane (porosity 40%) having a thickness of 15 μm through a dip coating process to obtain a separator provided with porous coating layers on both surfaces thereof. The thickness of the separator is shown in the following Table 1.

Referring to the resultant separator, the total content of the binder in the two porous coating layers formed on both surfaces of the polyethylene porous membrane was 20 wt % and the weight ratio between PVdF-HFP and nitrile-butadiene rubber was 90:10. Herein, the porous coating layers formed on both surfaces of the separator had the same binder content and the same weight ratio between PVdF-HFP and nitrile-butadiene rubber.

Example 2

A separator was manufactured in the same manner as Example 1, except that the weight ratio between PVdF-HFP and nitrile-butadiene rubber was 80:20.

Example 3

A separator was manufactured in the same manner as Example 1, except that the weight ratio between PVdF-HFP and nitrile-butadiene rubber was 85:15.

Example 4

A separator was manufactured in the same manner as Example 1, except that the weight ratio between PVdF-HFP and nitrile-butadiene rubber was 95:5.

Comparative Example 1

A separator was manufactured in the same manner as Example 1, except that the weight ratio between PVdF-HFP and nitrile-butadiene rubber was 75:25.

Comparative Example 2

A separator was manufactured in the same manner as Example 1, except that the weight ratio between PVdF-HFP and nitrile-butadiene rubber was 70:30.

Comparative Example 3

A separator was manufactured in the same manner as Example 1, except that the weight ratio between PVdF-HFP and nitrile-butadiene rubber was 60:40.

Evaluation for Physical Properties of Separators

The separators obtained according to Examples 1-4 and Comparative Examples 1-3 were determined for air permeation time and heat shrinkage. The results are shown in the following Table 1.

(1) Air Permeation Time

Gurley air permeability values were determined according to the method of ASTM D726-94. Gurley used herein is resistance against air flow and is measured by a Gurley densometer. The Gurley air permeability value described herein is shown as time (seconds) required for 100 mL of air to pass through a section of 1 in² under a pressure of 12.2 inches of H₂O, i.e., air permeation time.

(2) Heat Shrinkage

Each of the separators obtained according to Examples 1-4 and Comparative Examples 1-3 was cut into a size of 50 mm×50 mm, placed between A4 paper sheets, introduced to a convection oven at 150° C. for 30 minutes, and then its heat shrinkage was measured in the machine direction (MD) and transverse direction (TD). Herein, heat shrinkage was calculated by the formula of [(initial length−length after heat treatment)/(initial length)×100].

TABLE 1

|  | Thickness of separator (μm) | Air permeation time (Gurley) (s/100 mL) | Heat shrinkage (MD/TD) (%) 150° C., 30 minutes |
|---|---|---|---|
| Ex. 1 | 23.5 | 446 | 16/14 |
| Ex. 2 | 23.8 | 451 | 18/18 |
| Ex. 3 | 23.6 | 434 | 14/14 |
| Ex. 4 | 23.7 | 458 | 18/20 |
| Comp. Ex. 1 | 24.1 | 545 | 32/35 |
| Comp. Ex. 2 | 24.5 | 570 | 38/40 |
| Comp. Ex. 3 | 24.8 | 584 | 42/44 |

Referring to Table 1, each the separators obtained according to Examples 1-4 includes a fluorine-based binder and a rubber-based binder in its porous coating layer and satisfies the condition that the weight ratio between the fluorine-based binder and the rubber-based binder is 80:20-99.9:0.1. As a result, it can be seen that each of Examples 1-4 shows an air permeation time and heat shrinkage improved significantly as compared to the separators according to Comparative Examples 1-3 out of the above-defined condition.

What is claimed is:

1. A separator comprising:
   a porous substrate having a plurality of pores; and
   a pair of porous coating layers formed on at least one surface of the porous substrate, and including a plurality of inorganic particles and a binder disposed partially or totally on the surface of the inorganic particles to connect and fix the inorganic particles with each other,
   wherein the binder is used in an amount of 5-40 wt % based on the total weight of the porous coating layer,
   the inorganic particles include boehmite particles and non-boehmite particles other than the boehmite particles,
   wherein the boehmite particles have a smaller average particle diameter compared to the average particle diameter of the non-boehmite particles, and
   the binder includes a fluorine-based binder and a rubber-based binder, and the fluorine-based binder and the rubber-based binder are used at a weight ratio of 85:15 to 90:10,
   wherein the boehmite particles have an average particle diameter of 0.05 μm to 0.4 μm, and the non-boehmite particles have an average particle diameter of 0.5 μm to 3 μm, wherein the weight ratio of the non-boehmite particles to the boehmite particles is 85:15 to 95:5.

2. The separator according to claim 1, wherein the fluorine-based binder is any one selected from the group consisting of polyvinylidene fluoride, polyvinylidene fluoride-co-hexafluoropropylene, polyvinylidene fluoride-co-trichloroethylene, polytetrafluoroethylene and polychlorotrifluoroethylene, or a mixture of at least two of them.

3. The separator according to claim 1, wherein the rubber-based binder is any one selected from the group consisting of nitrile-butadiene rubber, hydrated nitrile-butadiene rubber, styrene-butadiene rubber, hydrated styrene-butadiene rubber and silicone rubber, or a mixture of at least two of them.

4. The separator according to claim 1, wherein the non-boehmite particles comprise inorganic particles having a dielectric constant of 5 or more, inorganic particles capable of transporting lithium ions or a mixture thereof.

5. The separator according to claim 4, wherein the inorganic particles having a dielectric constant of 5 or more comprise $BaTiO_3$, $Pb(Zr,Ti)O_3$ (PZT), $Pb\_hd 1-xLa_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC or a mixture thereof.

6. The separator according to claim 4, wherein the inorganic particles capable of transporting lithium ions comprise lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$) or a mixture thereof.

7. The separator according to claim 1, wherein the porous substrate is a polyolefin-based porous substrate.

8. The separator according to claim 7, wherein the polyolefin-based porous substrate comprises any one polymer selected from the group consisting of polyethylene, polypropylene, polybutylene and polypentene, or a combination thereof.

9. The separator according to claim 1, wherein the porous substrate has a thickness of 5-50 μm, a pore size of 0.01-50 μm and a porosity of 10-95%.

10. An electrochemical device comprising a cathode, an anode and a separator interposed between the cathode and the anode, wherein the separator is the separator as defined in claim 1.

11. The electrochemical device according to claim 10, which is a lithium secondary battery.

12. The separator according to claim 1, wherein a heat shrinkage in a machine direction (MD) is from 14% to 16%, and a heat shrinkage in a transverse direction (TD) is 14%.

13. The separator according to claim 1, wherein an air permeation time is 434 s/100 mL to 446 s/100 mL.

* * * * *